(12) United States Patent
Blouch

(10) Patent No.: US 6,862,815 B1
(45) Date of Patent: Mar. 8, 2005

(54) MULTI-FUNCTIONAL MEASURING AND LAYOUT DEVICE

(76) Inventor: Ruth G. Blouch, 1503 W. Bay Ave., Barnegat, NJ (US) 08005-1097

( * ) Notice: Subject to any disclaimer, the term of this patent is extended or adjusted under 35 U.S.C. 154(b) by 0 days.

(21) Appl. No.: 10/654,092

(22) Filed: Sep. 3, 2003

(51) Int. Cl.⁷ .................................................. G01B 3/14
(52) U.S. Cl. .......................................... 33/562; 33/567
(58) Field of Search ....................... 33/562, 567, 27.03, 33/27.031, 27.032, 413, 520, 483, 484, 485, 486, 487, 492, 44, 644, 670, 555.2, 756, 732, 738, 743; 434/112, 115, 162

(56) References Cited

U.S. PATENT DOCUMENTS

| | | | | |
|---|---|---|---|---|
| 645,653 A | * | 3/1900 | White | 33/413 |
| 697,701 A | * | 4/1902 | Ayer | 33/562 |
| 888,848 A | * | 5/1908 | Rapson | 7/160 |
| 1,126,398 A | * | 1/1915 | Cleophas | 177/44 |
| 1,317,030 A | * | 9/1919 | Menssen | 33/732 |
| 1,348,861 A | * | 8/1920 | Frye, Jr. | 33/562 |
| 1,380,187 A | * | 5/1921 | Brose | 33/562 |
| 1,624,150 A | * | 4/1927 | Scherer | 33/562 |
| 1,860,174 A | * | 5/1932 | Cronk | 33/563 |
| 1,877,341 A | * | 9/1932 | Kurtz, Jr. | 33/492 |
| 2,507,073 A | * | 5/1950 | White | 177/251 |
| 2,554,099 A | * | 5/1951 | Ermold | 33/487 |
| 2,579,664 A | * | 12/1951 | Gleasman | 33/492 |
| 2,595,081 A | * | 4/1952 | Johnson | 33/27.03 |
| 2,939,219 A | * | 6/1960 | Georges | 33/492 |
| 3,315,361 A | * | 4/1967 | Mutter | 33/27.03 |
| 3,805,390 A | * | 4/1974 | Craig | 33/27.03 |
| 4,455,750 A | * | 6/1984 | Sturz | 33/43 |
| 4,565,012 A | * | 1/1986 | Bilodeau et al. | 33/458 |
| 4,614,042 A | | 9/1986 | Maurer | |
| 4,802,283 A | * | 2/1989 | Trump | 33/431 |
| 5,050,309 A | * | 9/1991 | Wang | 33/449 |
| 5,501,019 A | * | 3/1996 | Concari et al. | 33/494 |
| 5,746,001 A | | 5/1998 | Fisher | |
| 5,881,469 A | | 3/1999 | Monck | |
| 6,192,594 B1 | | 2/2001 | Wackowski | |
| 6,243,959 B1 | | 6/2001 | Monck | |
| 6,529,122 B1 | | 3/2003 | Magnussen et al. | |

* cited by examiner

*Primary Examiner*—Christopher W. Fulton
*Assistant Examiner*—Amy R. Cohen
(74) *Attorney, Agent, or Firm*—Joseph P. Katrick, Esq.

(57) ABSTRACT

A multi-functional measuring device made of lightweight material planed on one edge in a succession of ascending steps representing dimensional increments. Successive steps ascend over one-half the length of the device and, at the mid-point, level off and begin to descend in dimensional increments for the remaining length, providing a visual image and tactile profile for the user. Centerline notches are cut on both the upper and lower edges, and are used to locate the center point of an object High and low profiles are cut into specific locations to allow for visual and tactile determination of specific subdivision dimensions. A notch is provided at each end of the device to accommodate linear measurements exceeding the length of the device. The lower face surface is punctuated with a series of holes. Small diameter holes, marking dimensional increments, are arranged in a straight line parallel to the lower edge, opposite the ascending and descending steps. Large diameter holes, marking additional dimensions, are arranged in an alternating pattern with the small diameter holes.

29 Claims, 11 Drawing Sheets

MULTI-FUNCTIONAL MEASURING AND LAYOUT DEVICE

CROSS-REFERENCE TO RELATED APPLICATIONS

None

STATEMENT REGARDING FEDERALLY SPONSORED RESEARCH OR DEVELOPMENT

None

REFERENCE TO SEQUENCE LISTING, A TABLE, OR A COMPUTER PROGRAM LISTING COMPACT DISK APPENDIX

None

BACKGROUND OF THE INVENTION

1. Field of the Invention

The field of this invention is measuring devices. Vast multitudes of measuring devices have been created and used through the course of time to measure not only linear dimensions but also non-linear dimensions. Measuring devices allow the user to qualify spatial relationships observed in a two dimensional format. Systems of measurement are based on either the English system with the foot as the base unit of measure or the metric system with the meter as the base unit of measure. The English system is divided into fractional parts and the metric system is divided into decimal portions of the meter.

The present invention relates to a measuring apparatus and methods for measuring and proportioning linear distances, more particularly to tactilely accessible measuring devices for teaching recognition and understanding of units of measure. This device has features designed to facilitate education of beginner measuring device users regarding the concepts of measurement It also has features intended to make acquisition of such skills equally simple for vision-impaired or tactilely oriented learners.

2. Description of the Related Art

Various measuring devices and measuring teaching devices have been used from the start of civilization. Current devices for measurement and teaching measurement vary from a simple graduated ruler to electronic devices capable of extremely accurate measurement. The measuring devices of interest which relate to this invention include devices that allow for feel of the graduations, that can be used to teach beginners how to effectively use a measuring device, and, which facilitate ease of use.

Various rulers have been designed to serve as teaching aids for instruction in units of measure. For example, U.S. Pat. No. 4,614,042 issued Sep. 30, 1986 describes a measuring and instructional ruler for use by persons having learning impairments or physical handicaps. The device has a base panel with one-inch subdivisions delineated by both visual and tactile features. This device also has a top panel which slides on the base panel and has a series of tabs, which are marked in increasing fractions of an inch. The device is used by placing the edge of the base panel on one end of an object to be measured and setting the edge of the sliding top panel against the other end of the object A reading is then taken from the top panel tabs to the subdivisions on the base panel.

Among the limitations of this invention are the following; use for relatively short distances, the embodiment demonstrates only a compact size requiring the user to manipulate thin panels, addresses only fractions of an inch, and its limitation to illustrating the significance of inch and lesser graduations.

U.S. Pat. No. 5,746,001 issued May 5, 1998 discloses a ruler which comprises a teaching aid for instruction in fractional and decimal units of linear measure. It consists of an elongated rectangular body with beveled edges and a central slide. The slide allows a student to determine and verify the fractional portion of a distance measured. Limitations of this patent are; the device only teaches fractional units of measure, cannot respond to distances not allowing lengthwise registration of the device, cannot accomplish center locating or bifurcating functions, and for the flexible embodiment, the assisted reading (labeled graduations) are not direct reading (applied to the observed distance).

Another Patent, U.S. Pat. No. 5,881,469 issued Mar. 16, 1999 discloses a measuring and instructional ruler which is comprised of a base panel with standard units of measure delineated thereon and a transparent sheet with the fractional increments of the same standard units of measure as the base panel. The transparent sheet is positioned over the base panel allowing the student to see the relationship between the unit of measure and the fractional increments thereof. Limitations include; requiring changing to different scales (overlays) to access varying degrees of resolution, only addresses conventional desk-top type ruler applications, and the useful range of graduations must be relocated to the area of interest to number a measurement reading.

Still another, U.S. Pat. No. 6,192,594 B1 describes a ruler that is a triangular shaped prism with three faces and twelve scaled working edges, four located on each prism face. A reference mark from one scale can be interrelated to another scale by turning the prism over to show the new scale in turn allowing a user to learn the interrelationship between fractions, mixed numbers, and decimals. A limitation of this invention is that it addresses unconventional odd common denominators, which can be simulated by applying any conventional ruler obliquely between two parallel demarcations. Its construction of twelve scales over one-half length on each prism face limits the functionality of this device versus a conventional draftsman or architect scale or the device proposed herein; also, this invention has no tactile characteristics. This invention allows the user to learn interrelationships between fractions, decimals, and mixed numbers, based on the English system only.

The Monck patent (U.S. Pat. No. 6,243,959 B1) concerns a ruler device for use in measuring distance and construction of linear objects. It is also used during linear measurement instruction as well as demonstration of the relationship between units of measure and fractional equivalents of these units. Similar to U.S. Pat. No. 5,881,469, this invention consists of a base panel having units of measure and a transparent top panel with fractional increments. The top panel is overlaid on the base panel to demonstrate the relationship between units of measure and fractional equivalents of these units. Limitations for this invention include; the requirement of full discrimination of several colors, the degree of resolution is limited by graduation line width, application to non-distance units such as time, angles, and volumes requires the compilation of a graph, and with regard to compass points or trigonometric functions, it only covers circles to the extent of circular templates the user builds.

The aforementioned patents are focused on a single use as an instructional aid. Still another device, a tactile measuring device, is described in U.S. Pat. No. 6,529,122 B1. This invention utilizes two conductive workpieces, which bear on one another and measure an object through conductivity of a closed cell foam workpiece. This invention does not include visual use and requires an electrical source.

A common shortcoming with all these measuring devices is that each requires the user to have previous knowledge and understanding of the function and use of a ruler. Users must be able to accurately read and comprehend the whole unit and subunit demarcations on a ruler. All the above mentioned patents focus primarily on fractional increments to demonstrate the relationship between such sub-units and the base unit of measure.

In summary, various measuring and instructional ruler devices have been invented that offer functionality for certain applications. However, none of these offer the multitude of uses and teaching aids that the current invention provides.

BRIEF SUMMARY OF THE INVENTION

The present invention provides a multi-functional, measuring device for use during the instruction of linear measurement, having sufficient resolution for everyday tasks. This device comprises a measuring device for use as a proportioning reference tool, for use in estimating, measuring and construction of spatial objects, for use during the instruction of measurement concepts, for use in indexing to provide multiple layout points. Additionally, it has use as an instrument to demonstrate the relationship between a given unit of measure and said standard units of measure.

This patent addresses a device that reinforces teaching and understanding of units of measure by incorporating various tactile as well as visual qualities of said units of measure to enhance their representation and application to spatial relationships resulting in better acquisition of resultant quantities by the device user. It is suitable for widespread use among sighted and non-sighted students and the general populace.

It is an object of this invention to provide a measuring device to be used in the measurement of distance and objects and to use when drawing.

It is further an object of this invention to provide an educational tool which will facilitate instruction in the use of conventional tools of measurement.

It is still another object of this invention to provide a measuring tool of the aforesaid nature of sufficient construction and low cost that it may find widespread use amongst educators and persons.

These objects and other beneficial objects and advantages of this invention will be apparent from the following description of the preferred embodiment in accordance with the present invention described as a measuring tool comprising a lightweight piece of material with two faces, two long edges, two short edges, and a distal length. The longitudinal upper long edge is shaped in a succession of ascending increments of five centimeters to the midpoint where these steps level off and descend in five-centimeter increments for the remaining length. The total length of the preferred embodiment of this invention is one meter with a V-shaped notch located at the fifty-centimeter mark on both of the long edges and at each short edge of the measuring device. On one edge of this device, alternating raised and depressed profile areas, each equaling one centimeter in length, are cut into the face of each five-centimeter step and along the upper long edge of the stair-step arrangement of the device. The profile areas begin at one end of the device and continue along its entire length.

A plurality of equally spaced holes, in straight-line arrangement, is punctuated along the lower face surface of the tool, parallel to the straight edge. All of the holes demarcate five-centimeter increments. Counter-bored holes are interspersed among the simple holes at ten-centimeter increments along the wide side of the measuring device. The holes, steps, profile areas and V-shaped notches provide locations to insert or affix pins or writing instruments which permit the measuring device to perform functions otherwise accomplished by beam compasses, dividers, trammel points, scribers and "shadow posts" used for triangulation observations.

Said device can be used to measure the distance between two points, to measure objects, or to replicate two-dimensional constructs.

Said device can be used as a centering device, whereby one proceeds visually and tactically, to locate either the upper or lower "V" notch at the center (fifty-centimeter) mark when positioning the device versus two fixed points. The "V" notches are oriented transverse to the device face and extend full width across their respective upper or lower edge of the device.

It may be used as a guide to locate a centerline and to arrange objects symmetrically about a point or a line. Either a centerline notch or the fifty-centimeter hole may be used as a fulcrum location to use the device as a balancing arm.

Said device can be used to measure lengths greater than one meter by winding non-stretchable cordage, wire, or similar item around the device horizontally, and securing in "V" notches, end for end. The "V-shaped" notches at the proximal and distal ends are oriented transverse to the device face and extend full width across their respective device end. The elevation of these notches, above the device lower edges situates them collinear with the plurality of equally spaced holes.

Said measuring device can be used as an educational aid to facilitate instruction in the use of conventional metric rulers for the sighted as well as the visually impaired. A user, sighted or non-sighted, can simultaneously count by ones, fives and tens to acquire an accurate measurement.

Said device can be utilized as a demonstration tool or as a measuring tool in all circumstances that call for a measuring device. Such circumstances include elementary schools, technical schools, trade schools, prison, adult, and special abilities educational programs or in any household or business environment situation where there is a need for measurements.

This embodiment is also a useful device for teaching principles of vector calculus. It is useful in teaching the use of a protractor and the relationship of trigonometric functions to angles on the protractor.

This embodiment of the present invention is also useful in teaching polar geometry. Lessons may include learning the degrees of a circle corresponding to compass points, as well as the degrees of a circle between compass points. When presented using this measuring device, a student can readily understand the degree of a turn required to change direction of travel from a first compass point to a second compass point by linearly adjusting the device.

This embodiment of the present invention can be modified to demonstrate fractional relationships in the English system of units by redefining the overall length to be equal to one yard (thirty-six inches). The incremental stair-step arrangement and incremental high and low profile areas will then be set equal to inches and fractions thereof.

Said instructional measuring device can be used as an educational aid to facilitate instruction in use of conventional rulers.

The present invention includes methods by which relationships between units of angular measurement can be demonstrated and taught with the present invention. The present invention also includes methods by which vector mechanics and navigation can be demonstrated and taught using the devices of the present invention.

For angular measurements, the device can be used to draw a base and the major cord of a 180 degree semicircle, preferably in the form of a protractor, from which associated geometry and trigonometric functions can be rapidly and accurately determined.

The holes and incremental steps can be used to lay out curves demonstrative of the relationship between angular measurements and trigonometric functions.

Said device can be used as a linear or a circular layout tool, as a beam compass or a scribe. Parallel and/or radial cuttings can be produced using this device.

Another embodiment of the present invention utilizes narrow slits cut across the upper edge and face of the device to serve as subdivisions of the ascending/descending step intervals.

Another embodiment retains the alternating raised and depressed profile areas to designate these minor subdivisions, but extends their length fully across the device face and partially across its lower edge, rendering them accessible while the device variously is laid upon its edge or face. In this embodiment a thin portion of the lower edge remains intact (uncut) to serve as a straightedge.

Additionally, other embodiments can be produced which may be more convenient to use. One of these embodiments is a flexible strip capable of being coiled between uses. The textural features are applied by forming in the substrate or disposition of high-build coatings. Another embodiment can be produced in a folding version when replicated on individual slats affixed to one another with either hinges or pivots. When aligned and deployed, this folding embodiment functions the same as its rigid counterpart.

For low-cost, educational, imaging, temporary or other uses, this invention can be produced in various lightweight or low volume versions using processes such as stamping, molding, printing, and the like.

Where a specific range of use is desired, overall size limitations are imposed, or finer resolution is sought, small-scale versions can be produced to accommodate those variations.

This inventive concept can be produced on material sections capable of retracting to longer or shorter extensions by mechanisms such as telescoping shapes. Telescoping variants can be equipped with locking features that enable the measuring device to be set at and replicate a range demonstrative of a specific measuring value.

Curvilinear, girth, and other irregular measurements can be made and demonstrated or taught with the use of a non-stretchable auxiliary cord or other similar item, which is then compared to the scales provided on the measuring device. The cord itself can be marked (graduated) or unmarked. Attaching a similar cord to the measuring device provides convenience for the foregoing illustrated exercise and can be utilized to extend the range of this measuring device.

Wrapping cordage about the measuring device allows the transference and replication of the measuring device features upon the cord. Such an auxiliary cord also can he stored conveniently in a compartment within the measuring device or stowed while remaining attached, in its own package compatible with the user's handling of the measuring device.

When positioned in the recesses and holes provided on this measuring device, ancillary trammel points or pins allow the device to be used as a center finder, scribe, beam compass, or pitch (angle) layout device. Such ancillary reference points, when properly affixed, permit the measuring device to be used for distance estimation and remote length sensing by application of the geometric principles of triangulation.

This inventive concept is applicable to both the metric and English standard units systems. Original or job-specific measuring bases can also be applied and laid out with subdivisions, graduations, or highlights after the same fashion. In addition, the measuring device can be enhanced or converted to other scales or sizes by the addition of physical overlays featuring different graduations, resolution, or sizes.

DETAILED DESCRIPTION OF THE INVENTION

As will be described below, the measuring and layout device has multiple advantages including the ability to be constructed in a simple manner and produced economically. Moreover, it can be made from durable, impact resistant and flexible material. The measuring device has numerous uses as a linear measurement aid and a linear units educational tool. It is designed with a series of elevated steps as well as a series of depressed and elevated increments representative of two differing degrees of resolution. All graduations are both visually and tactually discernable, thus making the measuring device useful for the sight impaired as well as the general population. Deployed near the bottom edge of the device is an array of holes that can be used for geometric and trigonometric measurements and layouts. The V-shaped notches on the top and bottom edges at a mesial location aid use of the device as a center finder, scribe, or balance. The V-shaped notches on the proximal and distal ends provide a simple attachment for additional linear measurement, such as non-stretchable cordage. The use of simplified basic units provides a versatile educational tool for new learners. Many others can take advantage of its simplified intuitive scales.

Various embodiments are included with extended grooves running across the face of the device for enhanced layout, but terminating very near one edge, allowing a contiguous straightedge surface to remain intact Parallax errors are avoided when tick marks are made to copy measurements.

Another embodiment extends the finer graduations across all faces, but in the form of narrow slits versus recesses. This allows rapid acquisition of step increments and finer layout markings. Redesigning the tool using the English system for measuring makes another embodiment. In this embodiment, each of the raised lands and lowered recesses or the distance between slits delineated along the top edge will be equal to one-half inch. Each stepped distance is equal to two inches, with an overall dimension of thirty-six inches.

Figure 1:
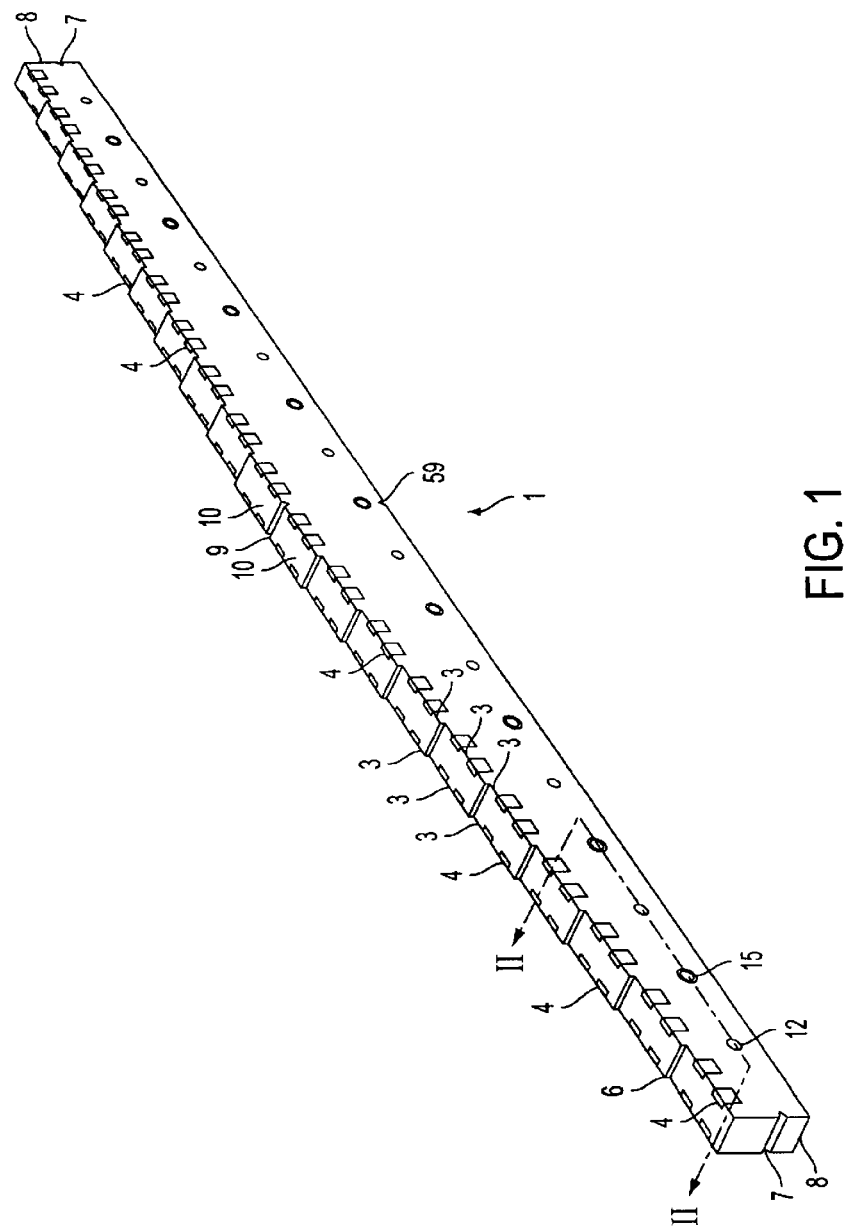
FIG. 1 is a perspective view of the preferred embodiment of the invention and shows the cross-section taken for FIG. 2.

Referring more particularly now to the drawings and reference numbers, wherein like numerals designate corresponding parts throughout the several views, in FIG. 1 there is shown the preferred embodiment of the measuring device which is designated generally by the number 1 comprising a flat device one meter long and having various holes 12, 15, recesses 4, V-shaped notches 7, 9, 59 lands 3 and steps 6. The holes 12, 15 are located at five-centimeter intervals. The holes 12, 15 differ from each other in that the first hole 12 from the edge of the measuring device is a straight hole sized for the approximate diameter of a writing instrument or pin. At both faces of the device, these holes 12 remain the same diameter, allowing for tactile identification. Holes 15 differ from the interspersed holes 12 as they are counter-bored at both faces of the device allowing for tactile identification of the different holes 12, 15. Each of the holes 12, 15 are located at the same linear position along the device at the five-centimeter steps 6. The straight holes 12 begin five-centimeters from the edge of the device and are interspersed between the counter-bored holes 15. The differing tactile feel of the holes 12, 15 allow the user to differentiate ten-centimeter intervals as well as the five-centimeter intervals between holes 12, 15. Steps 6 are located at five-centimeter intervals along one face of the device 1 and increase in height at each step 6 between each end of the device 1 to the center of the device which is identified by a notch 9. The differing rise that occurs between each step 6 allows for quick visual or tactile identification of a five-centimeter interval. On either side of the centerline V-shaped notch 9, the adjacent steps 6 are at the same comparable linear plane 10. Partially along one side and partially across the top of the device 1, one centimeter wide undercut recesses 4 are provided at a depth sufficient for both visual and tactile identification. These recesses 4 are interspersed between non-recessed lands 3 also one centimeter in width. Each step 6 interval is comprised of five one-centimeter divisions where the second and fourth one-centimeter division will be undercut recesses 4 and the first, third, and fifth one-centimeter divisions 3 will be full height lands and not undercut. Thus, two recesses and three lands comprise a five-centimeter step and the user can easily and quickly acquire one-centimeter resolution either before or after making coarse (five-centimeter) approximations.

When pins or writing instruments are used as compass implements, scribes or trammel points, measurements beginning or ending at the measuring device ends 8 can be registered by use of the V-shaped notches 7 provided on either end. These features are also employed when extended measurements (beyond the measuring device's self-contained one meter range) are acquired with the assistance of a non-stretchable cord, wire, or any other non-stretchable item which can be wrapped around the V-shaped notches 7 and evaluated on the measuring device face to determine the total cordage length used.

Figure 2:
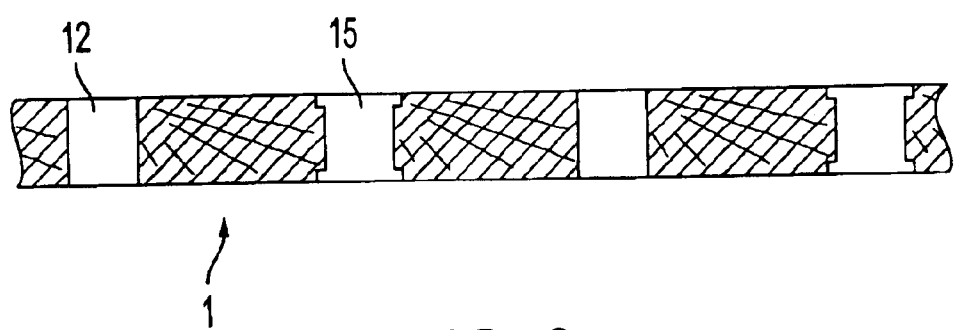
FIG. 2 is a cross-section of the multi-functional measuring and layout device showing the openings.

A typical cross-section II of the measuring device 1 from FIG. 1 is shown in FIG. 2. In a straight line along the length of the device at five-centimeter intervals are placed straight holes 12 through the device 1 from face to face and the counter-bored holes 15 are enlarged at each face of the device 1. The straight through holes 12 indicate ten-centimeter divisions starting at five centimeters from the end of the measuring device thusly; five centimeter, fifteen centimeter, twenty-five centimeter intervals and so on. Similarly, the counter-bored holes 15 also indicate ten-centimeter intervals alternating with the straight holes 12 starting ten centimeters from the end of the measuring device thusly; ten centimeter, twenty centimeter, thirty centimeter intervals and so on. The combination of the straight holes 12 and the counter-bored holes 15 will allow for any measurement in five-centimeter increments with the undercut recesses 4 and the non-recessed lands 3 shown in FIG. 1 allowing for further refinement of measurement to one centimeter resolution.

Figure 3A:
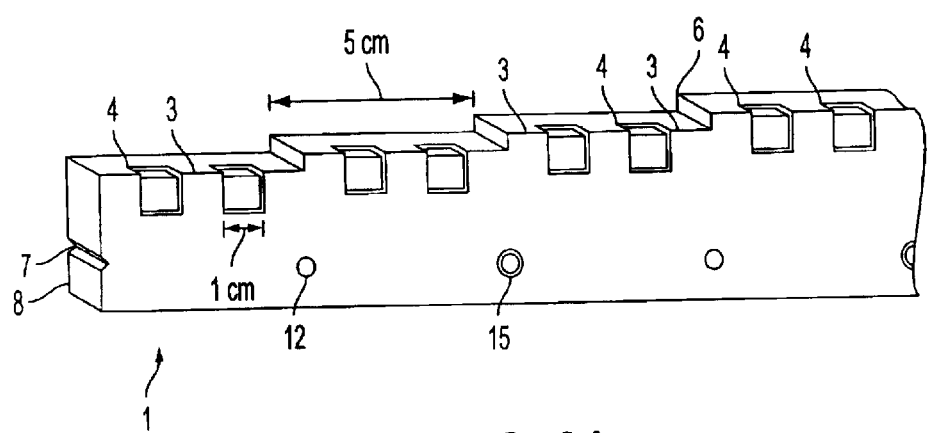
FIG. 3A is a partial view of a metric version showing the recesses and lands and dimensions of the various divisions.

An enlarged sectional view of the device 1 is shown on FIG. 3A showing the undercut recesses 4 located in each five-centimeter step 6 which steps ascend from the proximal device end 8 to its mesial centerline, thereafter descending to the distal device end. Finer resolution (one centimeter) is obtained by use of the recesses 4. Each one-centimeter wide recess is adjacent to one-centimeter (un-notched) lands 3. Thus, two recesses 4 and three lands 3 occupy each five-centimeter step 6. By reference to both 6 and 4 the user can record distances quickly to the nearest five centimeters and accurately to the nearest one centimeter.

Each step 6 coincides with a straight hole 12 or a counter-bored hole 15 with varying combinations of these holes 12, 15 indicating either five- or ten-centimeter intervals. The axis of these holes 12, 15 is collinear with the centerline of the end-located V-shaped notches 7.

Figure 3B:
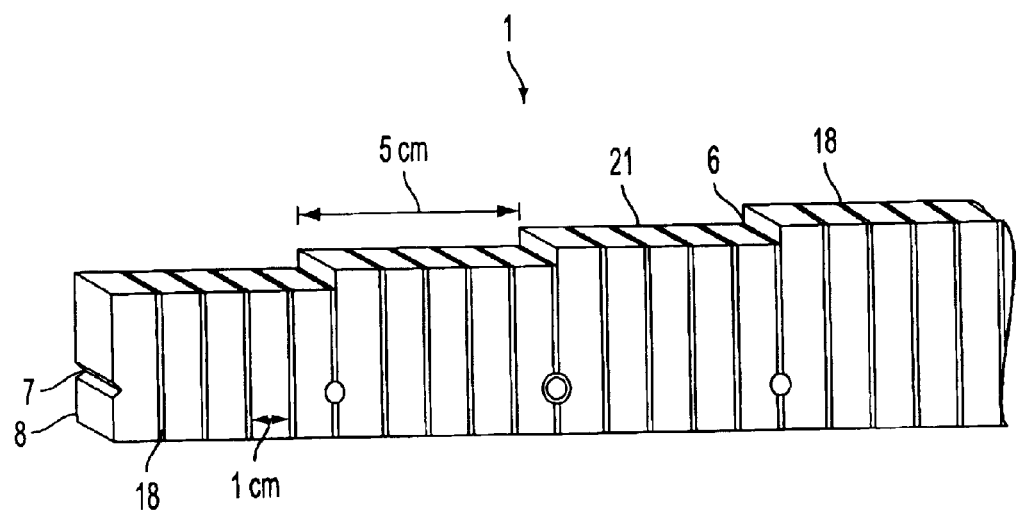
FIG. 3B is another metric version showing slits extended across the face and full depth across the upper edge.

An alternative embodiment of the measuring device 1 is shown in FIG. 3B. At one-centimeter intervals, narrow slits 18 spanning both the face and upper edge of the device 1 serve as visual and tactile graduations. At five-centimeter intervals, steps 6 are cut to facilitate acquisition of longer dimensions.

The steps 6 coincide with simple holes 12 and counter-bored holes 15 connoting five centimeters and ten-centimeter intervals, respectively, for use in conjunction with pins or writing instruments. Those holes 12, 15 align with the V-shaped notches 7 at either end 8 of the measuring device.

Each step 6 comprises four slits 18 separating five lands 21. Thus five one-centimeter intervals are demarcated within each step 6.

Figure 3C:
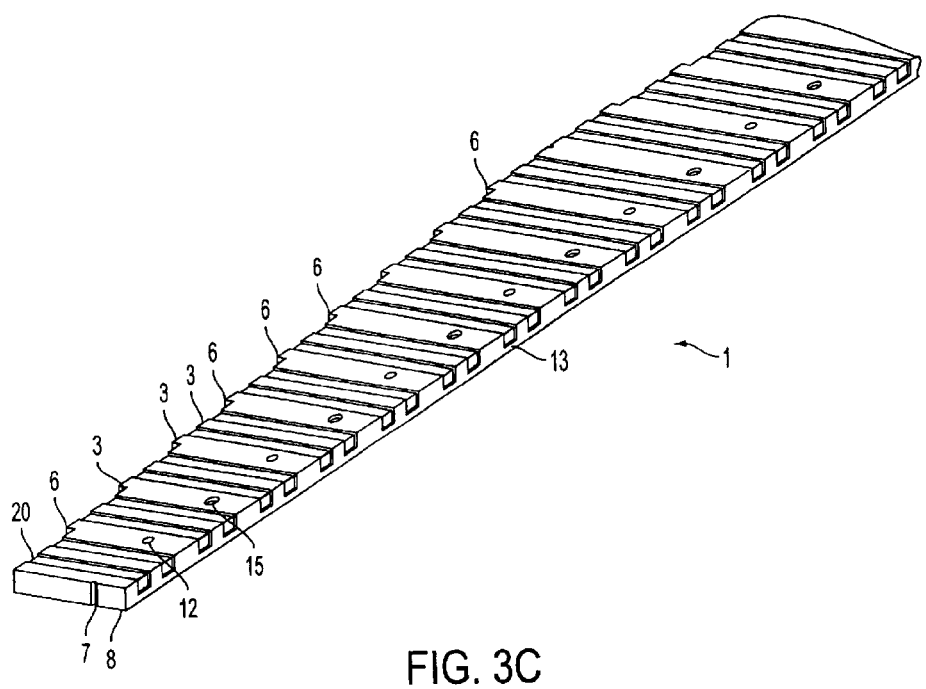
FIG. 3C is a portion of the device showing recesses extending almost fully around the device so that one can measure and mark along a straight edge.

Another alternative embodiment of the measuring device 1 is shown on FIG. 3C. In this embodiment the ascending and descending steps 6 are cut at five-centimeter intervals above the upper edge. One-centimeter wide recesses 20 are cut in the second and fourth one-centimeter wide bands within each five-centimeter step. Thus two recesses 20 and three lands 3 comprise each five-centimeter step.

In this embodiment, the recesses 20 extend across the measuring device face and almost fully across the measuring device lower edge. A narrow portion 13 of the lower edge remains intact (uncut). This embodiment permits the user to place the measuring device face up in a stable position and accurately transfer, to a work surface, measurements at least as fine as one centimeter. Accuracy is enhanced by the proximity of the recesses to the work surface. The thin uncut portion 13 of the edge preserves concurrent use of the measuring device as a straightedge without interference caused by the steps 6 or the recesses 20.

The simple holes 12 at five-centimeter intervals and counter-bored holes 15 at ten-centimeter intervals remain available for functions and uses employing pins or writing instruments. Similarly, the V-shaped notch 7 located at either end, aligned with the holes 12 and 15, is available for those same functions and applications involving the non-stretchable cord.

Figure 4:
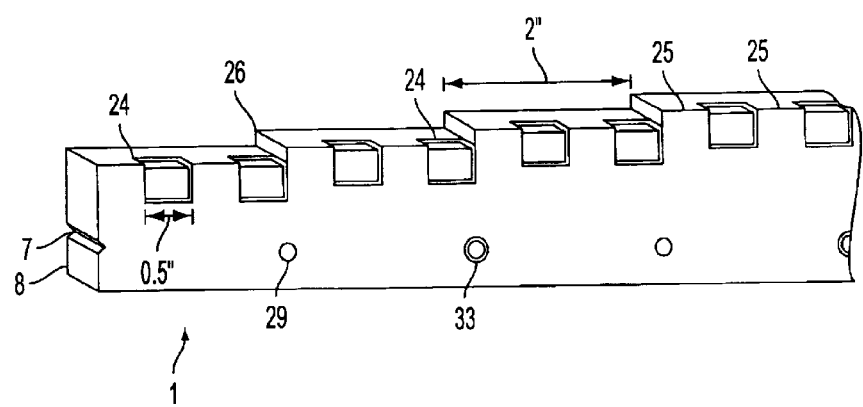
FIG. 4 is an English version of the device showing recesses and lands.

An alternative embodiment utilizing English units of measurement is shown on FIG. 4. The ascending steps 26, start at each end of the measuring device and peak at the centerline. Individual steps connote two-inch intervals. Within each step is located two 0.5 inch wide recesses 24 and two uncut lands 25, which together provide 0.5 inch resolution throughout the length of the measuring device.

A V-shaped notch 7 is provided on each end 8 of the measuring device for alignment of the device upon a work surface and use with ancillary layout devices (pins and writing instruments) or non-stretching cordage when making extended range measurements.

Collinear with those V-shaped notches 7 are located both simple holes 29 and counter-bored holes 33, which denote four-inch (two, six, ten inches, et cetera) intervals and (four, eight, twelve inches, et cetera) intervals, respectively.

Figure 5:
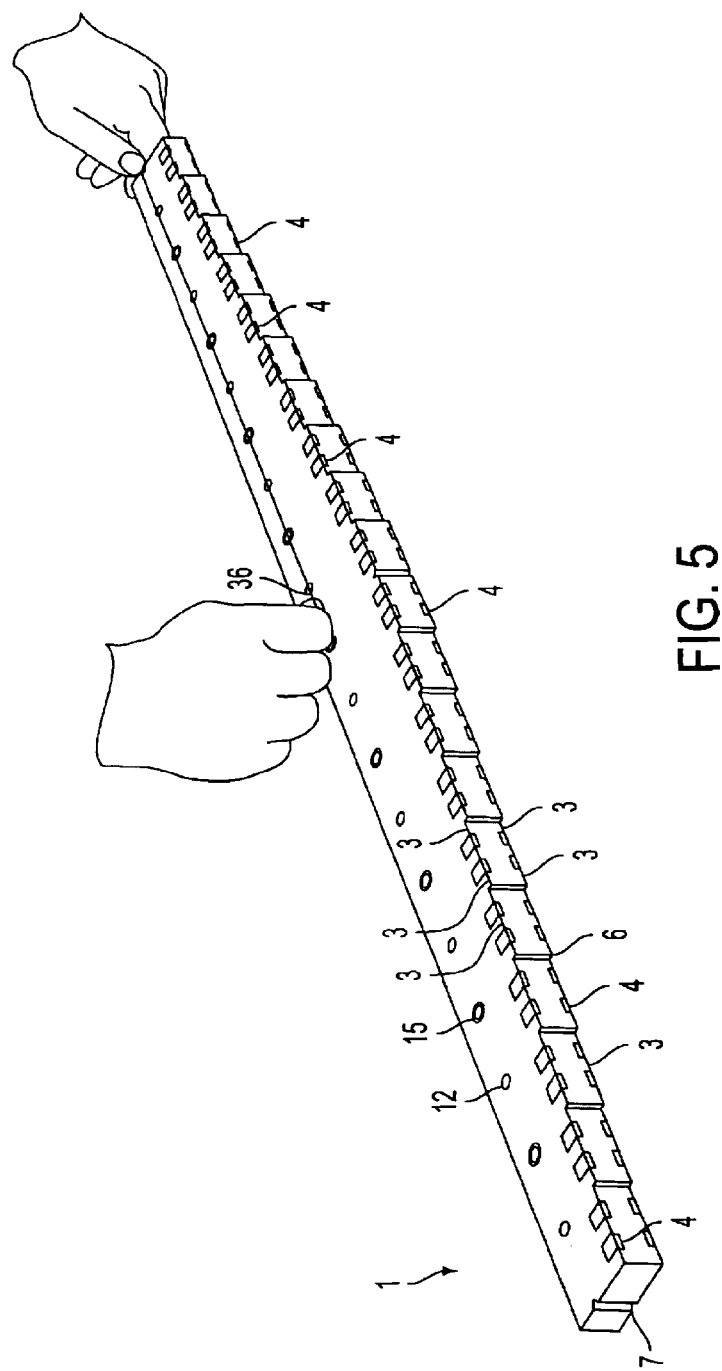
FIG. 5 shows the device being used to measure the length of a string.

Evaluating an extended range measurement is shown in FIG. 5. Measurements exceeding the normal length of the device 1 can be obtained by employing the device in conjunction with a length of non-stretching cord 36.

After comparison to a real object being measured, the cord is laid on the face of the measuring device 1 collinear with the end located V-shaped notches 7.

Then the length of the cord is evaluated by comparison with the ten-centimeter intervals connoted by counter-bored holes 15. Smaller increments are evaluated by comparison with the five-centimeter increments designated by the simple holes 12 and the steps 6. Still finer resolution is gained by evaluating the observed length using one-centimeter recesses 4 and lands 3.

Figure 6:
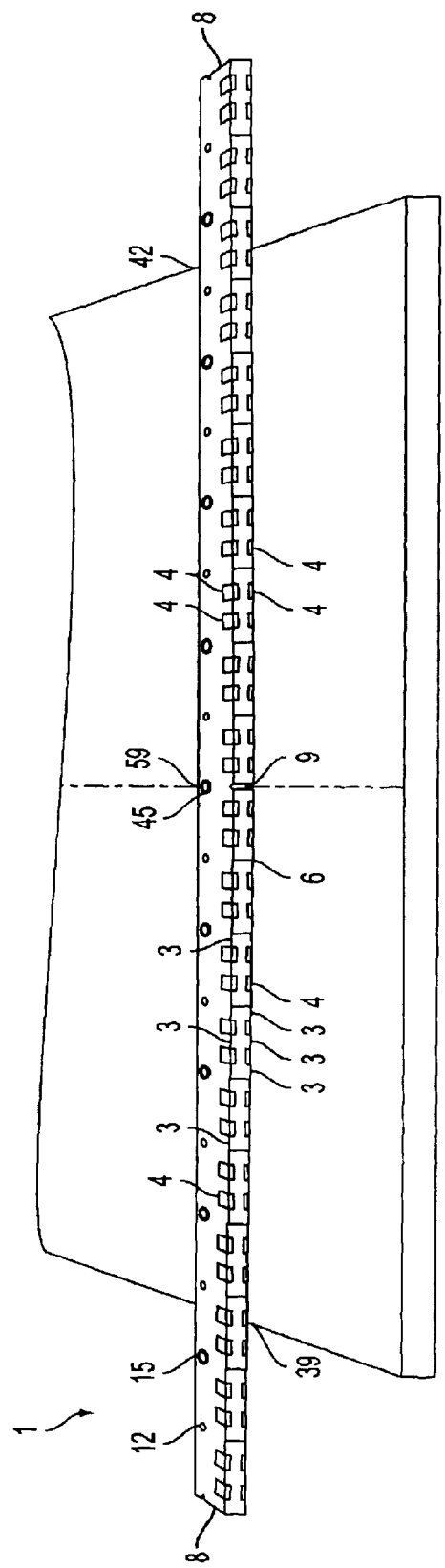
FIG. 6 shows the device being used to locate the center of a plane.

In FIG. 6, the measuring device is shown being used as a center finding tool. To find the center of a plane, any one of the counter-bored holes at midpoint 45, the upper V-shaped notch 9, or the lower V-shaped notch 59 can be set coincident with the mid-line of a surface when the edges of that surface 39 and 42 are located at equal distances from the respective ends 8 of the measuring device 1.

The end 8 versus edges 39 and 42 distances can be set equal by comparison with the five-centimeter and ten-centimeter intervals designated by the simple holes 12 and counterbored holes 15 as well as the one-centimeter recesses 4 and lands 3.

Figure 7:
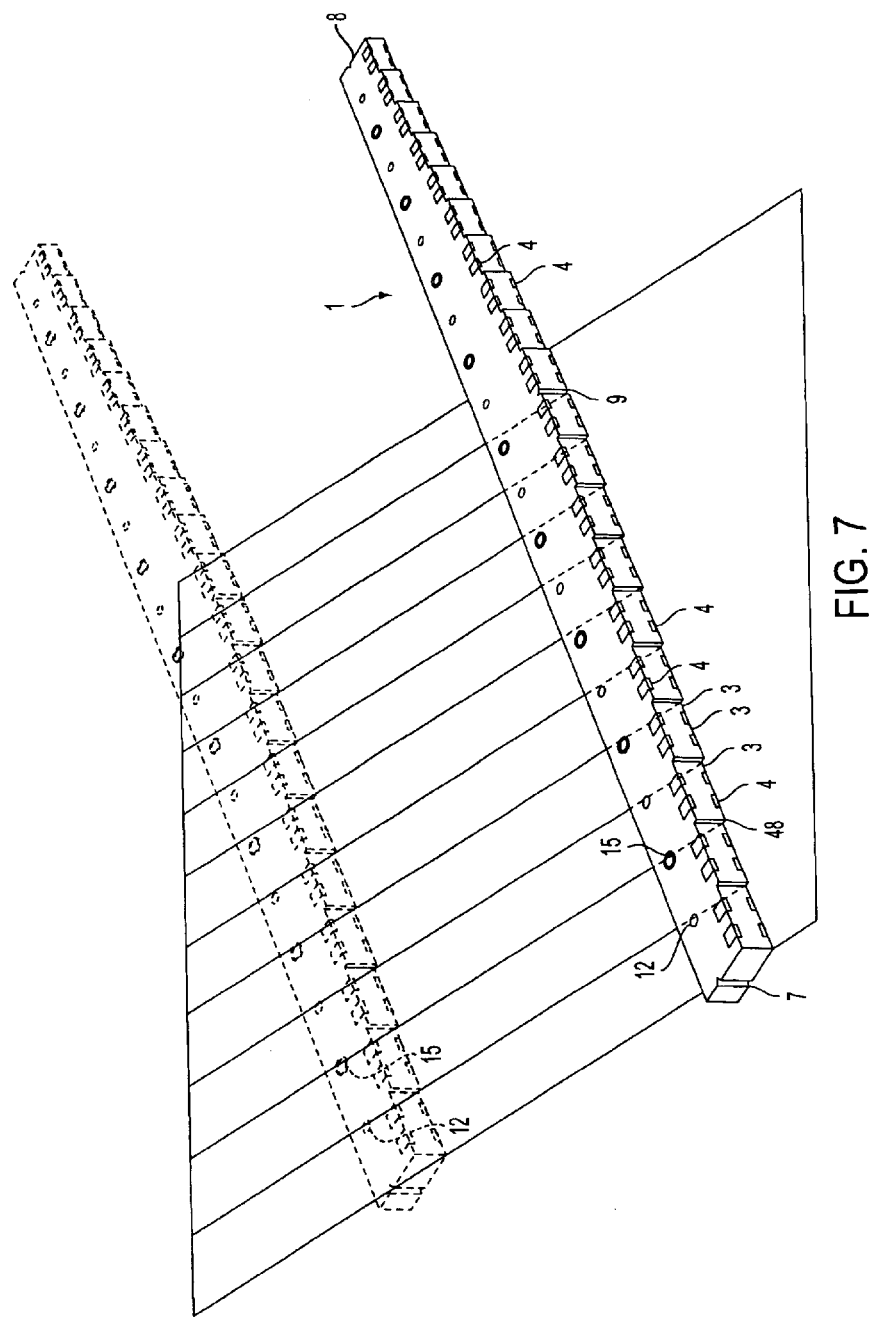
FIG. 7 shows the device being used to divide a plane into equal portions.

FIG. 7 depicts a planer surface being divided into a number of columns or intervals irrespective of the gradations provided by the measuring device utilized. The effective width increment is the projection of the measuring device gradation onto the plane.

When the measuring device 1 is laid obliquely across a given width at two points, the oblique angle can be adjusted so that measuring device features divide that width into any number of convenient intervals. Any convenient feature, such as at the five-centimeter steps 9 or one-centimeter recesses 4 or lands 3, can be utilized to draw tick marks then complete lines 48 denoting intervals or columns of the desired number, all equally spaced.

When the end located V-shaped notches 7 are aligned with the width extrema, the simple holes 12 at five-centimeter intervals and the counter-bored holes 15 at ten-centimeter intervals, can be used to tick off those intervals desired.

Figure 8:
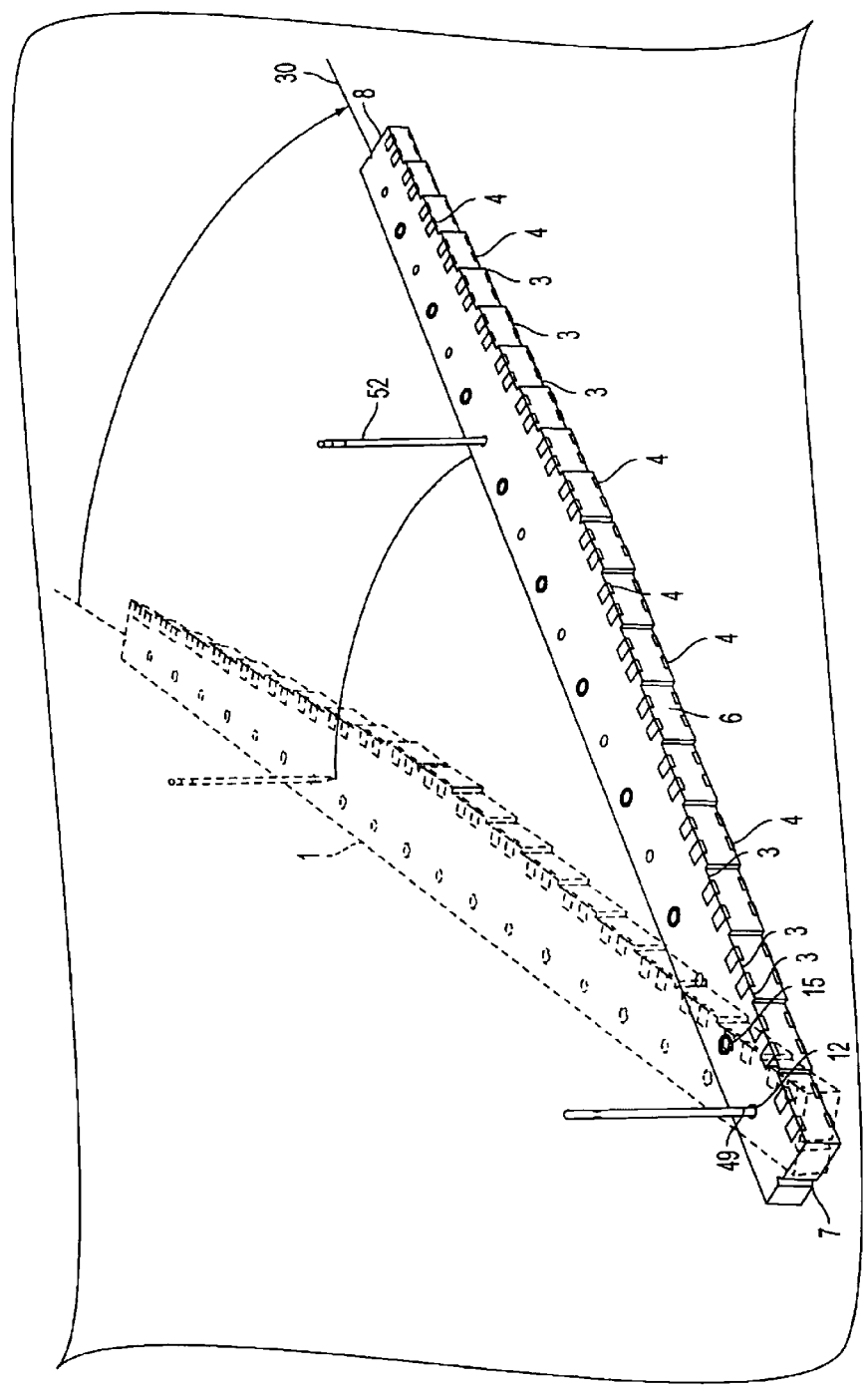
FIG. 8 shows the device being used as a compass creating an arc.

Polar geometry and trigonometric relationships can be drawn using the measuring device 1 to represent radii and chord distances. The measuring device I is shown facilitating a circular layout in FIG. 8. Other curvilinear layouts require repeated similar applications of the device. To construct an arc, a pin 49 is inserted into one simple hole 12 or counter-bored hole 15 or V-shaped notch 7, and another pin or writing instrument 52 can be inserted or affixed elsewhere to define a curve by swinging the measuring device to a second position 30.

Other radii can be laid out by positioning the writing instrument at the desired five-centimeter step 6, holes 12 or 15, or one-centimeter recess 4.

Figure 9:
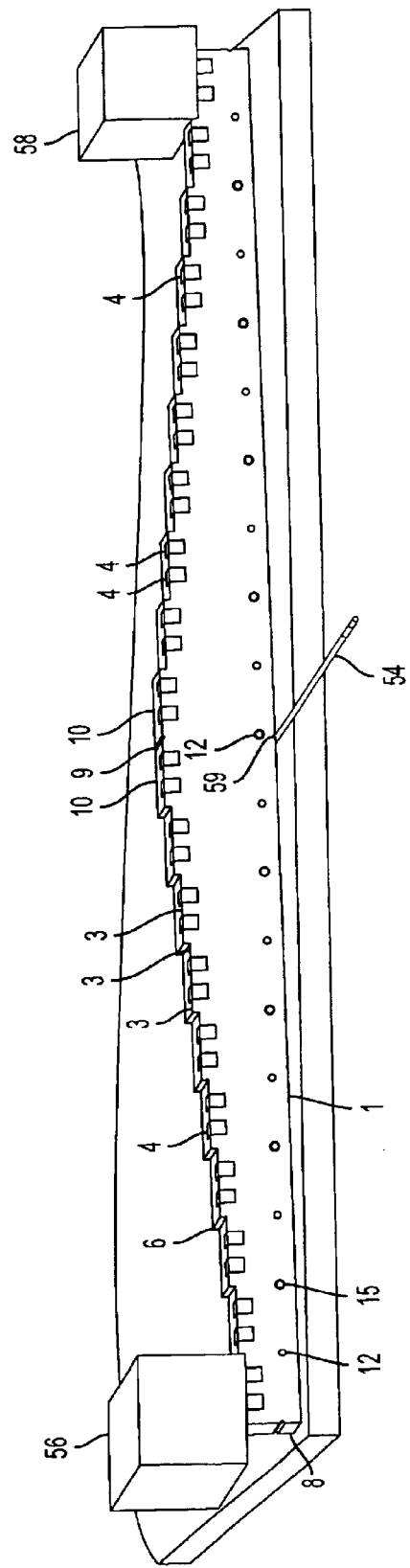
FIG. 9 shows the device being used as a balance.

A graduated axially symmetric beam can be used to evaluate masses versus one another and applied forces versus a known mass or combination of masses. The measuring device 1 is symmetric and can be used as a balance as shown on FIG. 9. In this application, any roller, pivot or knife-edge, for example, a pencil 54 or other suitable object can be positioned at the mesial bottom edge V-shaped notch 59 or centerline hole 12 to serve as a fulcrum. Then two masses 56 and 58 can be compared.

When balanced, the moment arms corresponding to two masses can be derived from information obtained by recording the distance denoted by intervening simple holes 12 and counter-bored holes 15, spaced five centimeters apart, and recesses 4 which are one centimeter wide and one centimeter apart (separated by lands 3) and one centimeter remote from step 6 transitions.

With moment arms known, the proportion of the two masses can be calculated. When one mass is known, the other mass can be mathematically derived; and the measuring device 1 functions as a weigh scale. In a similar fashion, a known mass or masses 56, 58 can be utilized to evaluate a force applied elsewhere to the measuring device (at remaining typical location 56 or 58) by acquisition of the same distinguishing moment arms and the same mathematical proportioning. In this application the measuring device 1 functions as a dynamometer.

These foregoing descriptions of the various embodiments should be taken as illustrating, rather than limiting, the present invention. As will be readily appreciated, numerous variations and combinations of the features set forth above can be utilized without departing from the present invention as set forth in the claims. Such variations are not regarded as a departure from the spirit and scope of the invention, and all such modifications are intended to be included within the scope of the following claims.

What is claimed is:

1. A multi-functional measuring device comprising:
   An elongate rectangular prismatic body having flat upper and lower faces, an elongated rectangular perimeter bounded by a stepped upper long edge and a straight lower long edge and parallel straight short leading and trailing end edges, said upper long edge having stepped subdivisions increasing in width from said lower long edge to the center of the device from either said straight leading or trailing end edge, further having a plurality of linearly arrayed holes corresponding to said steps on said upper long edge, located along the wide side of the measuring device near its straight edge, said holes comprising holes of two types; straight through holes and through holes counter-bored, said holes alternating between said straight through holes and said through holes counter-bored.

2. The measuring device of claim 1 further comprising a V-shaped notch at the mesial location of said stepped upper long edge and said straight lower long edge, said V-shaped notches being oriented transverse to said upper and lower faces and extending the full width across said long edges.

3. The measuring device of claim 1 further comprising a V-shaped notch at the leading and the trailing said end edges and arranged collinear with said array of through holes, said V-shaped notches extending full width across said end edges.

4. The measuring device of claim 1 further comprising a plurality of equal recessed and non-recessed subdivisions dividing each of said steps.

5. The measuring device of claim 1 further comprising a plurality of narrow slots extending partially across the upper edge and face, and subdividing each of said ascending or descending steps.

6. The measuring device of claim 1 further comprising subdivisions of each ascending or descending step by notches extending across the upper edge, across the face of said measuring device, and partially across said lower edge, allowing a narrow portion of the lower edge to remain intact as a straight edge.

7. The measuring device of claim 4 further comprising a series of recesses and lands or slots and lands within the interval demarcated by each step, and mesial V-shaped notches located at the upper and lower edges of the measuring device centerline, whereby said measuring device can be placed on a flat surface and the user can mark a linear distance or evaluate an extant linear distance on a surface by comparison with the measuring device features and then record or transcribe same to another location to be replicated elsewhere once or often through use of a combination of steps, recesses, V-shaped notches, slots, or through holes, when the measuring device is laid upon either its front or back face and the user transcribes tick marks to a working surface connoting one or more intervals depending upon the express steps, recesses, V-shaped notches, slots or through holes utilized.

8. The measuring device of claim 1 further comprising a series of recesses and lands or slots and lands within the interval demarcated by each step, and mesial V-shaped notches located at the upper and lower edges of the measuring device centerline, whereby said measuring device can be placed on a flat surface and the user can mark a linear distance or evaluate an extant linear distance on a surface by comparison with the measuring device features and then record or transcribe same to another location to be replicated elsewhere once or often through use of a combination of steps, recesses, V-shaped notches, slots, or simple and counter-bored holes, when the measuring device is laid upon either its front or back face and the user ascribes tick marks to a working surface connoting one or more intervals depending upon the express steps, recesses, V-shaped notches, slots or simple and counter-bored holes utilized.

9. The measuring device of claim 4, further comprising a series of recesses and lands or slots and lands within the interval demarcated by each step, and mesial V-shaped notches located at the upper and lower edges of the measuring device centerline, whereby said steps, recesses, V-shaped notches, slots, or through holes can be used in combination to mark a metric length or evaluate an extant linear distance on a surface by comparison with the measuring device features and then record or transcribe same to another location to be replicated elsewhere once or often, when the measuring device is laid upon either its front or back face and the user transcribes tick marks to a working surface connoting one or more intervals depending upon the express steps, counting by five centimeters and estimating the nearest 2.5 centimeter interval, recesses, counting by one centimeter and estimating the nearest 0.5 centimeter interval, V-shaped notches, counting by fifty centimeters and estimating the nearest twenty-five centimeter interval, slots, counting by one centimeter and estimating the nearest 0.5 centimeter interval, or through holes, counting by five centimeters and estimating the nearest 2.5 centimeter interval, utilized.

10. The measuring device of claim 1, further comprising a series of recesses and lands or slots and lands within the interval demarcated by each step, and mesial V-shaped notches located at the upper and lower edges of the measuring device centerline, whereby said steps, recesses, V-shaped notches, slots, or simple and counter-bored holes can be used in combination to mark a metric length or evaluate an extant linear distance on a surface by comparison with the measuring device features and then record or transcribe same to another location to be replicated elsewhere once or often, when the measuring device is laid upon either its front or back face and the user transcribes tick marks to a working surface connoting one or more intervals depending upon the express steps, counting by five centimeters and estimating the nearest 2.5 centimeter interval, recesses, counting by one centimeter and estimating the nearest 0.5 centimeter interval, V-shaped notches, counting by fifty centimeters and estimating the nearest twenty-five centimeter interval, slots, counting by one centimeter and estimating the nearest 0.5 centimeter interval or simple and counter-bored holes, counting by five centimeters and estimating the nearest 2.5 centimeters interval for simple holes, and counting by ten centimeters and estimating the nearest five centimeter interval for counter-bored holes, utilized.

11. The measuring device of claim 4, further comprising a series of recesses and lands or slots and lands within the interval demarcated by each step, and mesial V-shaped notches located at the upper and lower edges of the measuring device centerline, whereby said steps, recesses, V-shaped notches, slots, or through holes can be used in combination to mark intervals in the English system or evaluate an extant linear distance on a surface by comparison with the measuring device features and then recording or transcribing same to another location to be replicated elsewhere once or often, when the measuring device is laid upon either its front or back face and the user transcribes tick marks to a working surface connoting one or more intervals depending upon the express steps, counting by two inches and estimating the nearest one inch interval, recesses, counting by one-half inch and estimating the nearest 0.25 inch interval, V-shaped notches, counting by eighteen inches and estimating the nearest nine inch interval, slots, counting by one-half inch and estimating the nearest 0.25 inch interval, or through holes counting by two inches and estimating the nearest one inch interval) utilized.

12. The measuring device of claim 1, further comprising a series of recesses and lands or slots and lands within the interval demarcated by each step, and mesial V-shaped notches located at the upper and lower edges of the measuring device centerline, whereby said steps, recesses, V-shaped notches, slots, or simple and counter-bored holes can be used in combination to mark intervals in the English system or evaluate an extant linear distance on a surface by comparison with the measuring device features and then recording or transcribing same to another location to be replicated elsewhere once or often, when the measuring device is laid upon either its front or back face and the user transcribes tick marks to a working surface connoting one or more intervals depending upon the express steps, counting by two inches and estimating the nearest one inch interval, recesses, counting by one-half inch and estimating the nearest 0.25 inch interval, V-shaped notches, counting by eighteen inches, one-half yard and estimating the nearest nine inch interval, one-fourth yard, slots, counting by one-half inch and estimating the nearest 0.25 inch interval, or simple and counter-bored holes, counting by two inches and estimating the nearest one inch interval for simple holes, and counting by four inches and estimating the nearest two inch interval for counter-bored holes, utilized.

13. The measuring device of claim 4, further comprising a series of recesses and lands or slots and lands within the interval demarcated by each step, and mesial V-shaped notches located at the upper and lower edges of the measuring device centerline, whereby one illustrates distance relationships using a number line or counting approach when steps or through holes can be used to illustrate a spatial representation of one unit, recesses can be used to illustrate a spatial representation of sub-units, V-shaped notches can be used to illustrate a spatial representation of one-half a macro-unit, and slots can be used to illustrate a spatial representation of sub-units.

14. The measuring device of claim 1, further comprising a series of recesses and lands or slots and lands within the interval demarcated by each step, and mesial V-shaped notches located at the upper and lower edges of the measuring device centerline, whereby one can illustrate distance relationships using a number line or counting approach when steps or simple holes can be used to illustrate a spatial representation of one unit, recesses can be used to illustrate a spatial representation of sub-units, V-shaped notches can be used to illustrate a spatial representation of one-half a macro-unit, slots can be used to illustrate a spatial representation of sub-units, and counter-bored holes can be used to illustrate a spatial representation of multiple units.

15. The measuring device of claim 4, further comprising a series of recesses and lands or slots and lands within the interval demarcated by each step, and mesial V-shaped notches located at the upper and lower edges of the measuring device centerline, whereby one can acquire measurements visually or tactilely using the attributes of said measuring and layout device by positioning the measuring device in proximity to a length of specific interest to facilitate (a) visual discernment or tactile survey to assess the desired distance first to the crass resolution afforded by the V-shaped notches, (b) then refinement by reference to the resolution afforded by the through holes and steps, and (c) then improved accuracy by comparison to the finer resolution by the use of visual or tactile reference to the series of recesses and lands nearest one of the measurement endpoints.

16. The measuring device of claim 1, further comprising a series of recesses and lands or slots and lands within the interval demarcated by each step, and V-shaped notches located at the upper and lower ends of the measuring device centerline, whereby one can acquire measurements visually or tactilely using the attributes of said measuring and layout device by positioning the measuring device in proximity to a length of specific interest to facilitate (a) visual discernment or tactile survey to assess the desired distance first to the crass resolution afforded by the V-shaped notches, (b) then refinement by reference to the resolution afforded by the counter-bored holes, (c) subsequently improved accuracy to the resolution afforded by the simple holes and steps, and (d) finally discrimination to greater accuracy by comparison to a finer resolution by the use of visual or tactile reference to the series of recesses and lands nearest one of the measurement endpoints.

17. The measuring device of claim 4, further comprising a series of recesses and lands or slots and lands within the interval demarcated by each step, and mesial V-shaped notches located at the upper and lower edges of the measuring device centerline, whereby one can transfer or lay out specific measurements visually or tactilely after positioning the measuring device in a convenient location and position, whereupon the user employs his visual or tactile sense to replicate an observed measurement by successively noting the endpoints of the desired interval relative to (a) the V-shaped notches, (b) the through holes or steps, and (c) the series of recesses and lands nearest the endpoints.

18. The measuring device of claim 1, further comprising a series of recesses and lands or slots and lands within the interval demarcated by each step, and mesial V-shaped notches located at the upper and lower edges of the measuring device centerline, whereby one can transfer and lay out specific measurements visually or tactilely after positioning the measuring device in a convenient location and position, whereupon the user employs his visual or tactile sense to replicate an observed measurement by successively noting the endpoints of the desired interval relative to (a) the V-shaped notches, (b) the counter-bored holes, (c) the simple holes or steps, and (d) the series of recesses and lands nearest the endpoints.

19. The measuring device of claim 6 whereby one can transfer or lay out specific measurements using said measuring device to accomplish ancillary straightedge functions after positioning the measuring device in a convenient location and position, whereupon the user employs his visual or tactile sense to replicate an observed measurement by successively noting the endpoints of the desired interval relative to (a) the V-shaped notches, (b) the through holes or steps, and (c) the series of recesses and lands nearest the endpoints, following which the user can subsequently employ said uncut narrow portion of the measuring device lower edge to complete lines and rules extending along and about said interval of measurement just transferred or laid out.

20. The measuring device of claim 3 in conjunction with a non-stretchable cord, wire, or other non-stretchable item whereby one can acquire and evaluate curvilinear distances and distances greater in length than said device by comparison of the cord with the gradations of said device, having affixed any convenient length of a non-stretchable cord in a suitable manner, then having employed it as an effective extension of the measuring device length by (a) drawing the cord across the (straight or curvilinear) path to be measured and (b) noting the extent of cord utilized by marking, grasping, knotting, severing or other, whereupon one can then replicate that distance or path using the cord or evaluate the measurement obtained by (c) comparing the cord length of interest to the measuring device, including lengths greater than the measuring device length which can be obtained by wrapping said cord about the leading and trailing V-shaped notches, then counting the multiple strands arranged on each face of the measuring device, after which (d) the remainder length of said cord and distances lesser than the measuring device length can be evaluated by successive comparison to first the leading and trailing V-shaped notches, next the through holes and steps, and further a series of recesses and lands nearest its end.

21. The measuring device of claim 2 whereby one can locate various mid-points of planar shapes or chord lengths by use of said device's center-line indications after aligning said measuring device parallel to the axis or chordal length sought to be bifurcated, and positioning it in an upright or inverted attitude, dependent upon the downside or overhead position of the work objective and the degree of resolution desired, whereupon the user interprets the difference between the proximate work surface endpoint and the measuring device proximate end, then similarly interprets the difference between the distal work surface endpoint and the measuring device distal end, thus enabling the user to compare the two quantities derived and subsequently equalize them in a series of iterative motions, moving the measuring device in a manner that lessens the larger quantity and increases the smaller quantity until a point in time when the two difference quantities have been set equal, at which time the mesial V-shaped notch designates the mid-point.

22. The measuring device of claim 1 further comprising a series of recesses and lands or slots and lands within the interval demarcated by each step, and V-shaped notches located at the upper and lower ends of the measuring device centerline, whereby one can deploy said device in successive juxtapositions to divide an area into any number of equally or unequally spaced intervals by applying it obliquely along the intended range of measured subdivisions, whereupon one chooses the desired number of intervals and selects the measuring device features which shall correspond to each interval, then indexes the measuring device obliquely across the surface to be divided such that said selected features span the objective area, and demarcates the desired intervals with tick marks or another method, thus enabling the user subsequently to relocate the measuring device to another parallel location on said surface, again indexing the same features and completing a second set of demarcations, which two sets of demarcations, more can be had over a large area, then illustrate the said equally or unequally spaced intervals or subdivisions and can be connected by lines or rulings as desired.

23. The measuring device of claim 1 further comprising a series of recesses and lands or slots and lands within the interval demarcated by each step, and V-shaped notches located at the upper and lower ends of the measuring device centerline, whereby, in conjunction with one or more writing instruments or pins, one can complete arcs and circles at various radii when the user elects to draw an arc with a radius denoted by any selected features on the measuring device and further utilizes said writing instruments or pins by inserting them into said simple or counter-bored holes; or suitably affixing them to other measuring device features, the user then positions one of said accoutrements at the focus of the arc, center of a circle, and proceeds to swing the measuring device in either radial direction, thus producing the desired curve.

24. The measuring device of claim 1, further comprising a series of recesses and lands or slots and lands within the interval demarcated by each step, and V-shaped notches located at the upper and lower ends of the measuring device centerline, in conjunction with one or more writing instruments, sticks or pins, whereby one can derive ranges or elevations through the process of geometric triangulation while observing a distant object or its shadow, for which purpose the user may position the measuring device with its axis parallel to the axis of said objective image, and from a single vantage point select two features: V-shaped notches, simple or counter-bored holes, steps, recesses or lands, of the measuring device which optically coincide with the extrema of said objective image, and after noting the distance between said selected features of the measuring device, and noting the distance from said vantage point to the base, point of intersection, of the measuring device axis with the ground or reference plane supporting both the measuring device and the objective image, of the measuring device using the measuring device itself, and noting the range from said base point to the base of said objective image using the measuring device itself, one has acquired data sufficient to characterize two similar triangles by proceeding to solve the classical geometric relationships that govern such triangles and produce a measurement of said distant object using only the measuring device and said easily improvised accoutrements.

25. The measuring device of claim 1, further comprising a series of recesses and lands or slots and lands within the interval demarcated by each step, and V-shaped notches located at the upper and lower ends of the measuring device centerline, in conjunction with any suitable fulcrum placed in its mesial V-shaped notch or hole, whereby one can utilize it as a balance beam capable of comparing masses when the user supports the measuring device on a provided fulcrum and positions two masses, one on either side of the measuring device centerline, whereupon if the system defined by the foregoing is not balanced, one end of the measuring device will tip downward, indicating the user can move the mass on the downward tipping end of the measuring device inward, toward the measuring device centerline, and alternatively the user can move the mass on the upward tipping end of the measuring device outward, away from the measuring device centerline, both these actions taken to approach more closely the point of balance, which foregoing procedure can be iterated until said masses are positioned at the point of balance, state of equilibrium, at which the measuring device, balance arm, remains level, following which the user can note the positions of said masses and, using the features of the measuring device: V-shaped notches, simple and counter-bored holes, steps, recesses and lands, evaluate the moment arm associated with each mass, thus enabling the user to know the proportion between the masses, and further, if one mass is known, the user may calculate by the above said means the remaining mass.

26. The measuring device of claim 1, further comprising a series of recesses and lands or slots and lands within the interval demarcated by each step, and V-shaped notches located at the upper and lower ends of the measuring device centerline, in conjunction with any suitable fulcrum placed in its central V-shaped notch or hole, and one or more known masses, whereby one can determine the magnitude of a force applied elsewhere along the length of said measuring and layout device when the user supports the measuring device on said fulcrum provided and positions one or more known masses on one side of the measuring device centerline and a suitable force application device: yoke, lanyard, noose, cradle or other such mechanical construct connected to the force with a suitable uni-axial linkage, on the other side of the measuring device centerline, whereupon if the system defined by the foregoing is not balanced, one end of the measuring device will tip downward, indicating the user may move the combined mass or "force" on the downward tipping end of the measuring device inward, toward the measuring device centerline, and concurrently the user may move the combined mass or "force" on the upward tipping end of the measuring device outward, away from the measuring device centerline, both these actions taken to approach more closely the point of balance, which foregoing procedure can be iterated until said mass and "force" are positioned at the point of balance, state of equilibrium, at which the measuring device, balance arm, remains level, following which the user can note the positions of said mass and "force" and, using the features of the measuring device: V-shaped notches, simple or counter-bored holes, steps, recesses and lands, evaluate the moment arm associated with each, thus enabling the user to know the proportion between the mass and the applied force, and further the user may then calculate the magnitude of the applied force.

27. The measuring device of claim 1, further comprising a series of recesses and lands or slots and lands within the interval demarcated by each step, and V-shaped notches located at the upper and lower ends of the measuring device centerline, in conjunction with two writing instruments or pins, whereby one can perform functions customarily associated with trammel points or dividers when the user selects an interval utilizing any of the measuring device features: V-shaped notches, simple or counter-bored holes, steps, recesses or lands, to denote its endpoints and insert or suitably affix said accoutrements after which the user can produce layouts and trials by "stepping off" the designated interval repeatedly along various paths after the fashion of the use of trammel points or dividers as used in various art work, crafts, design, navigation and the like, and subsequently make refinements to his selected interval by utilizing the measuring device to evaluate the remainder or error resulting from the foregoing procedure.

28. The measuring device of claim 1, further comprising a series of recesses and lands or slots and lands within the interval demarcated by each step, and V-shaped notches located at the upper and lower ends of the measuring device centerline, in conjunction with one or two writing instruments or pins, whereby one can perform the functions of a scriber when the user selects an interval utilizing any of the measuring device features: V-shaped notches, simple or counter-bored holes, steps, recesses or lands, to denote its endpoints and insert or suitably affix said accoutrements, whereupon the user can produce layouts and trials by dragging the designated interval along the margin to be scribed as would an artisan or craftsman seeking to contour scribe, match line or trim a work piece and subsequently make refinements to his selected interval by utilizing the measuring device to evaluate the remainder or error resulting from the foregoing procedure.

29. The measuring device of claim 1 further comprising a series of recesses and lands or slots and lands within the interval demarcated by each step, and V-shaped notches located at the upper and lower ends of the measuring device centerline, whereby one can find various mid-points of an opening or orifice when said measuring device is aligned parallel to the plane of said opening or orifice sought to be evaluated, and positioned in either an upright or inverted attitude, dependent upon the downside or overhead position of the work objective and the degree of resolution desired, allowing the user to interpret the difference between the proximate work surface endpoint and the measuring device proximate end, then similarly interpret the difference between the distal work surface endpoint and the measuring device distal end, using the measuring device features: V-shaped notches, simple or counter-bored holes, steps, recesses and lands, after which the user can compare the two quantities derived and subsequently equalize them in a series of iterative motions, moving the measuring device in a manner that lessens the larger quantity and increases the smaller quantity, upon which, when the two difference quantities have been set equal, the mesial V-shaped notch designates the mid-point and readily supports a plumb bob or other location projection device, and said measuring device features may again be used to project the location of various intervals onto the plane of said opening or orifice.

* * * * *